United States Patent
Rajan et al.

(10) Patent No.: US 7,216,254 B1
(45) Date of Patent: May 8, 2007

(54) METHOD AND SYSTEM OF PROVIDING A WRITE-ACCESSIBLE STORAGE CHECKPOINT

(75) Inventors: Basant Rajan, Pune (IN); Milind Borate, Pune (IN); George Mathew, Sunnyvale, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 637 days.

(21) Appl. No.: 10/395,443

(22) Filed: Mar. 24, 2003

(51) Int. Cl.
*G06F 11/00* (2006.01)

(52) U.S. Cl. .................... 714/20; 714/19; 714/15
(58) Field of Classification Search ............ 714/19
See application file for complete search history.

(56) References Cited

U.S. PATENT DOCUMENTS

| | | | |
|---|---|---|---|
| 5,819,296 A | 10/1998 | Anderson et al. | 707/204 |
| 5,864,849 A * | 1/1999 | Bohannon et al. | 707/8 |
| 6,014,674 A * | 1/2000 | McCargar | 707/202 |
| 6,044,475 A * | 3/2000 | Chung et al. | 714/15 |
| 6,460,054 B1 * | 10/2002 | Grummon | 707/204 |
| 6,678,704 B1 * | 1/2004 | Bridge et al. | 707/202 |
| 6,714,949 B1 | 3/2004 | Frey, Jr. | 707/200 |
| 6,721,764 B2 * | 4/2004 | Hitz et al. | 707/202 |
| 6,792,518 B2 * | 9/2004 | Armangau et al. | 711/162 |
| 6,795,966 B1 * | 9/2004 | Lim et al. | 718/1 |
| 6,802,025 B1 * | 10/2004 | Thomas et al. | 714/15 |
| 6,871,245 B2 | 3/2005 | Bradley | 710/65 |
| 7,036,044 B1 * | 4/2006 | Verma et al. | 714/19 |
| 2003/0110190 A1 | 6/2003 | Achiwa et al. | 707/203 |
| 2004/0088316 A1 | 5/2004 | Cleraux et al. | 707/102 |
| 2005/0251500 A1 | 11/2005 | Vahalia et al. | 707/1 |

* cited by examiner

*Primary Examiner*—Scott Baderman
*Assistant Examiner*—Joshua Lohn
(74) *Attorney, Agent, or Firm*—Campbell Stephenson LLP (57) ABSTRACT

A method and system of providing a write-accessible storage checkpoint is disclosed. According to one embodiment of the present invention, a first writable storage checkpoint is associated with a first storage checkpoint of a storage checkpoint chain where the storage checkpoint chain is independent of the first writable storage checkpoint and a write operation is then performed utilizing the first writable storage checkpoint.

20 Claims, 9 Drawing Sheets

METHOD AND SYSTEM OF PROVIDING A WRITE-ACCESSIBLE STORAGE CHECKPOINT

BACKGROUND

1. Technical Field

The present invention relates to data storage and retrieval generally and more particularly to a method and system of providing a write-accessible storage checkpoint.

2. Description of the Related Art

Information drives business. For businesses that increasingly depend on data and information for their day-to-day operations, unplanned downtime due to data loss or data corruption can hurt their reputations and bottom lines. Data can be corrupted or lost due to hardware and/or software failure, intentional malicious action, and/or user error. To increase data consistency and integrity and minimize the impact of data corruption and loss, a number of techniques have been developed and implemented. One such technique involves the creation of a "storage checkpoint" of a file system or file set, sometimes also referred to as a checkpoint, or file system/set checkpoint.

A storage checkpoint is a disk and I/O efficient snapshot technology for creating a consistent, stable, point-in-time view of a file system or file set. Instead of making a physically separate copy or "mirror," a storage checkpoint identifies and maintains only changed data blocks via a copy-on-write mechanism, thus saving disk space and significantly reducing I/O overhead. Unlike a disk-based mirroring method, checkpoint technology does not require a separate storage pool. Rather, a storage checkpoint uses the free space pool of a file system for storage. Therefore, changed data blocks are maintained using the same underlying disk space. A storage checkpoint may be created based on another storage checkpoint as well as on a primary or "live" file system or file set. According to one technique, such storage checkpoints are created periodically based on a single file system or file set thus forming a storage checkpoint chain and providing a consistent image of data stored within a file system or file set at different points in time. This storage checkpoint chain may then be utilized to "rollback" the data to any instant in time represented by a storage checkpoint without requiring the storage of a complete copy of the data at each such instant.

A storage checkpoint of a primary or "live" file system or file set is generated by freezing the file system or file set for which the storage checkpoint is to be created, initializing the storage checkpoint's block map and thawing the previously frozen file system or set. A block map structure is used to provide a translation between an offset in a file and a data block on a disk. Freezing temporarily blocks all I/O operations so that current or pending I/O operations may be completed and the file system or file set is synchronized to disk.

After initializing the storage checkpoint's block map to reference data blocks of the file system or file set for which the checkpoint was created, the described file system or set is "thawed" to allow continued access. Typically, this operation is atomic, so that write ordering may be maintained. The storage checkpoint, when first created, does not contain any data blocks. Consequently, a storage checkpoint requires only enough storage initially to store its block map and may be created quickly relative to other volume management and file system operations.

Figure 1:
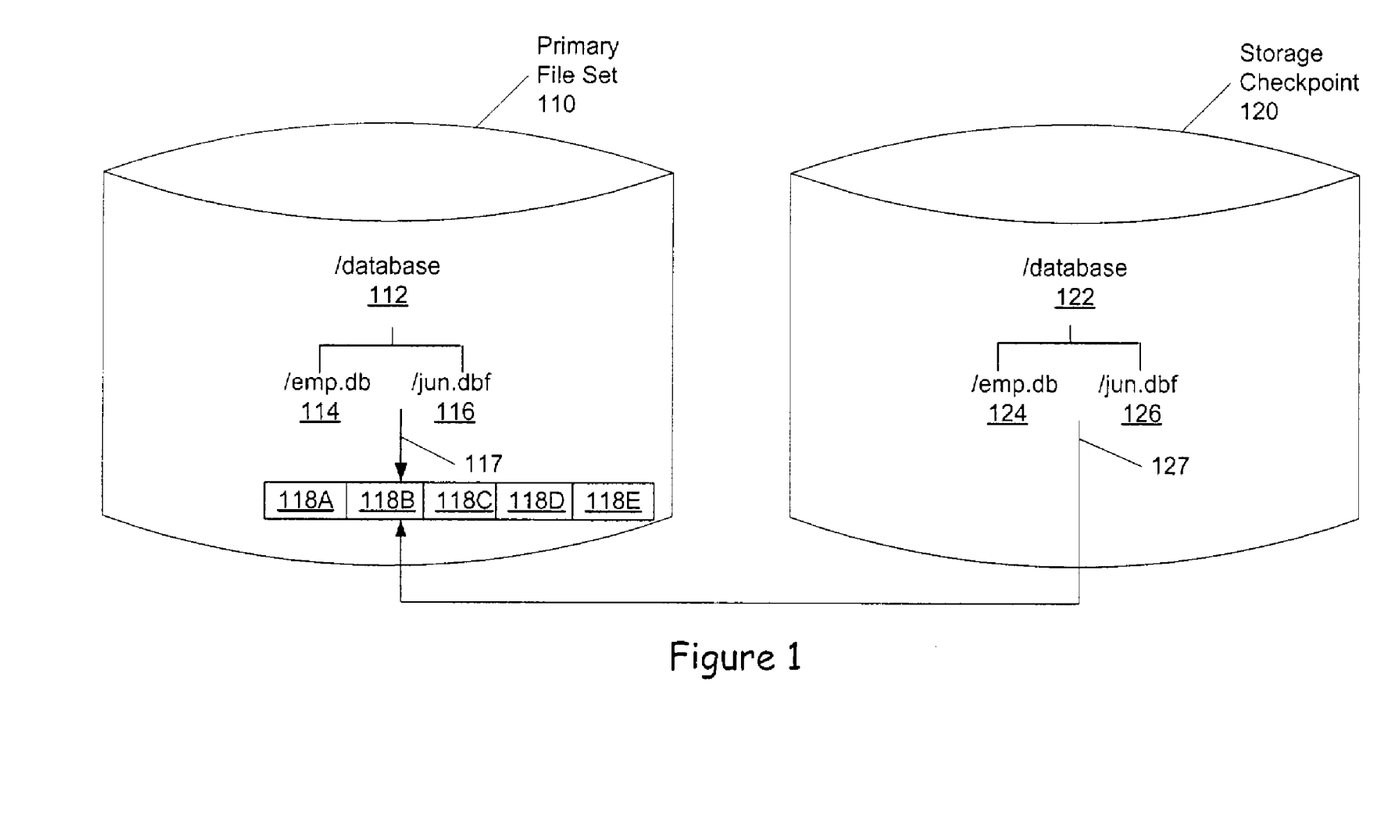
FIG. 1 illustrates a primary file set and an associated storage checkpoint according to the prior art.

FIG. 1 illustrates a primary file set and an associated storage checkpoint according to the prior art. In the embodiment of FIG. 1, a primary file set 110 including database 112 and an associated storage checkpoint 120 are depicted. Database 112 is shown as an example of a file set, although the invention can also be used for other types of file systems and files. Database 112 includes an emp.db namespace component 114 and a jun.dbf namespace component 116. As shown by arrow 117, data blocks 118A through 118E are stored within primary file set 110. In the accompanying drawing figures a series of blocks may represent a file system, a file set, or data blocks of a file system storage object (e.g., a data or "special" file, a hard or symbolic link, directory, or the like).

In this example, storage checkpoint 120 is logically identical to the primary file set 110 when storage checkpoint 120 is created, but storage checkpoint 120 does not contain actual data blocks. Storage checkpoint 120 includes database 122 having emp.db namespace component 124 and jun.dbf namespace component 126. Rather than containing a copy of the actual data, however, storage checkpoint 120 includes a reference 127 to the primary file set 110 data. One of skill in the art will recognize that reference 127 may be implemented in a variety of ways including as an array of pointers to individual data blocks within primary file set 110 or as a single pointer to a list of pointers to data blocks. Storage checkpoint 120 is created within the free space available to primary file set 110, and thereby minimizes the use of storage space.

Figure 2A:
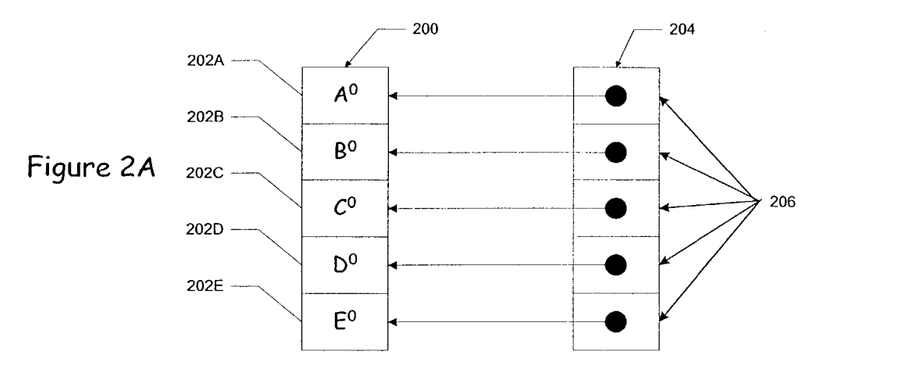
FIGS. 2A–2C illustrates the generation of storage checkpoint(s) within a file system according to the prior art.
Figure 2B:
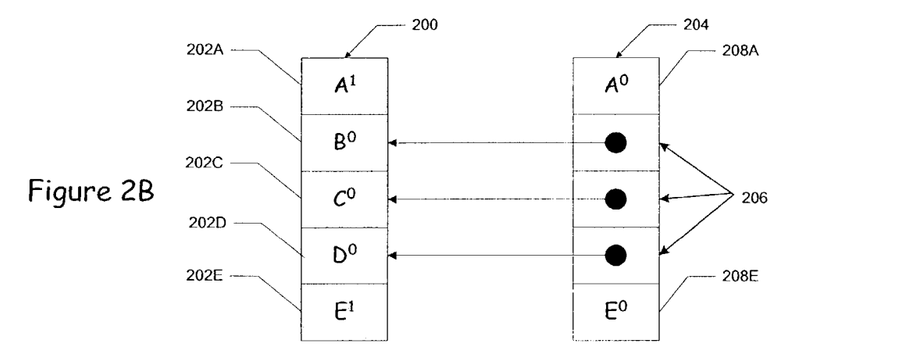
Figure 2C:
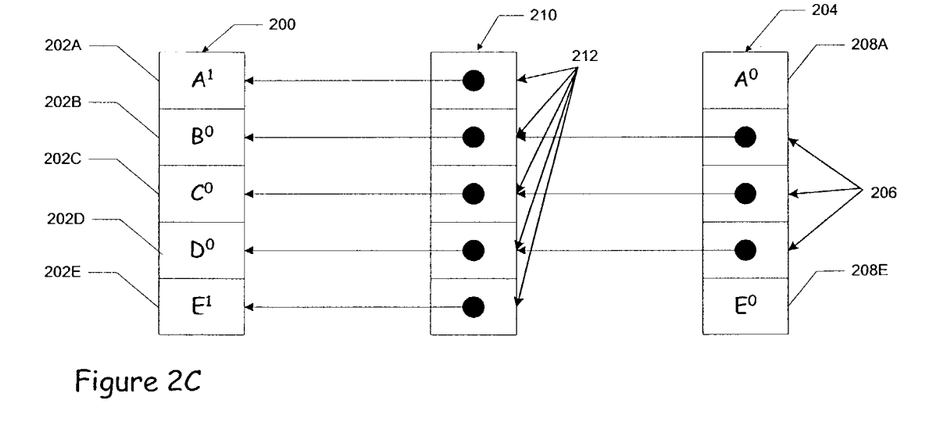

FIGS. 2A–2C illustrates the generation of storage checkpoint(s) within a file system according to the prior art. At a first time, $t_0$, represented by FIG. 2A, the illustrated file system includes a primary file set 200 including a plurality of data blocks 202A through 202E storing data $A^0$ through $E^0$, respectively, and a storage checkpoint 204 which in turn includes a plurality of references 206 (e.g., pointers, overlay extents, etc.) corresponding to data blocks 202 of primary file set 200 as shown. At a second time, $t_1$, represented by FIG. 2B, writes of $A^1$ and $E^1$ are performed to data blocks 202A and 202E to update data $A^0$ and $E^0$ of primary file set 200. Before the blocks of data are modified however, data blocks 208A and 208E are allocated within storage checkpoint 204 and the original data, $A^0$ and $E^0$, are copied into corresponding newly-allocated blocks as shown. As is illustrated in FIG. 2B, data blocks 208A and 208E then exist independently, without references 206 from storage checkpoint 204 to data blocks 208A and 208E of primary file set 200.

This copy-on-write mechanism allows a storage checkpoint to preserve the image of the primary file set at the point in time when the checkpoint was made. This point-in-time image may then be reconstructed using a combination of data from the primary file set 200 and one or more storage checkpoints. As primary file set 200 continues to be updated, storage checkpoint 204 gradually will be filled with "before image" data blocks. This does not mean every update or write results in copying data to storage checkpoint 204. For example, in the embodiment depicted within FIG. 2B, subsequent updates to block 202E, now containing $E^1$, will not trigger the copy-on-write mechanism because the original block data, $E^0$, has already been saved. The storage checkpoint 204 accumulates these "before image" data blocks until it is removed or the next storage checkpoint is generated.

Changes to the primary file set after a subsequent storage checkpoint has been generated are copied to the subsequent storage checkpoint, ensuring that "before images" are copied only once and to the most recently generated storage checkpoint, without consuming additional I/O operations or disk space. At a third time, t2, represented by FIG. 2C, the illustrated file system includes an additional storage checkpoint 210 of primary file set 200 which in turn includes a plurality of references 212 corresponding to data blocks 202 of primary file set 200. Thereafter any changes to primary file set 200 are reflected in the most recently formed storage checkpoint 210 rather than in storage checkpoint 204. Storage checkpoint 204 and storage checkpoint 210 form a storage checkpoint "chain" representing images of primary file set 200 at each point at which a storage checkpoint was generated.

Figure 3A:
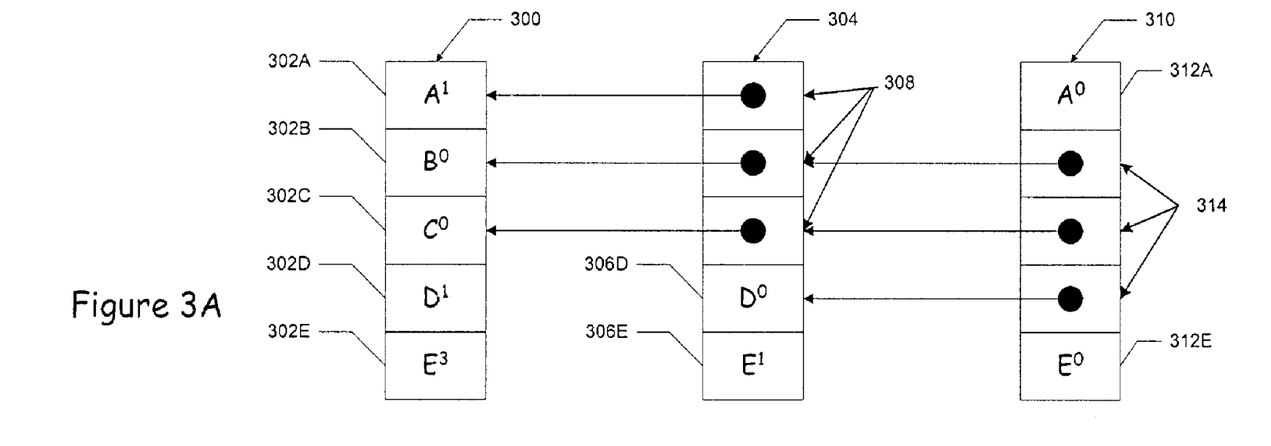
FIGS. 3A and 3B illustrate a storage checkpoint write operation according to a first prior art technique.
Figure 3B:
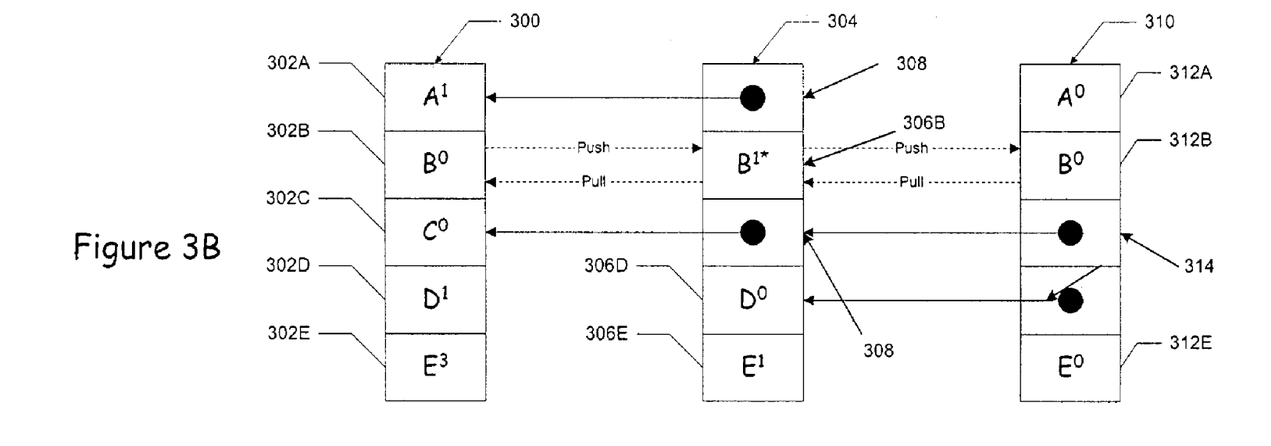

FIGS. 3A and 3B illustrate a storage checkpoint write operation according to a first prior art technique. At a first time, $t_0$, represented by FIG. 3A, the illustrated file system includes a primary file set 300 including a plurality of data blocks 302A through 302E storing data $A^1$, $B^0$, $C^0$, $D^1$, and $E^3$, respectively; a first storage checkpoint 304 including data blocks 306D and 306E storing data $D^0$ and $E^1$ and a plurality of references 308 corresponding to data blocks 302A through 302C; and a second storage checkpoint 310 including data blocks 312A and 312E storing data $A^0$ and $E^0$ and a plurality of references 314 corresponding to references 308 and data block 306D of storage checkpoint 304.

At a second time, $t_1$, represented by FIG. 3B, a write of $B^{1*}$ is performed to the first storage checkpoint 304. Before the described write operation may be performed however, data blocks 306B and 312B must be allocated within storage checkpoints 304 and 310, respectively, the original data, $B^0$, must be requested or "pulled" to storage checkpoint 310 and subsequently provided or "pushed" to storage checkpoint 310 from primary file set 200. Thus, a write to a target storage checkpoint (e.g., storage checkpoint 304) which is referenced by another storage checkpoint (e.g., storage checkpoint 310) in a conventional storage checkpoint chain suffers from a number of significant drawbacks. For example, each such write operation requires a read of previously-stored data (e.g., $B^0$ of data block 302B of primary file set 300), a write of that previously-stored data to the referring storage checkpoint, and a write of the actual data to the target storage checkpoint. Write ordering or "serialization" must also be maintained between storage checkpoint writes and writes to the file system's primary file set, creating additional administrative overhead. Multiple copies of data must be simultaneously stored (e.g., data $B^0$ within data blocks 302B and 312B) requiring additional storage resources. Additionally, any write directly to a storage checkpoint such as illustrated in FIG. 3B results in a loss of the point-in-time image of the primary file set at the time that storage checkpoint was created.

Figure 3C:
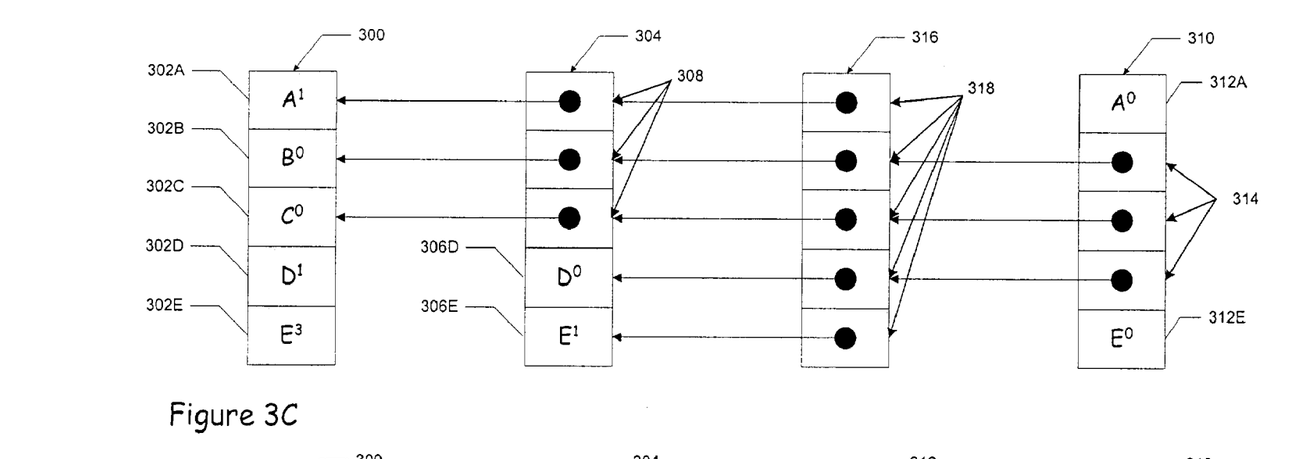
FIGS. 3C and 3D illustrate a storage checkpoint write operation according to a second prior art technique.
Figure 3D:
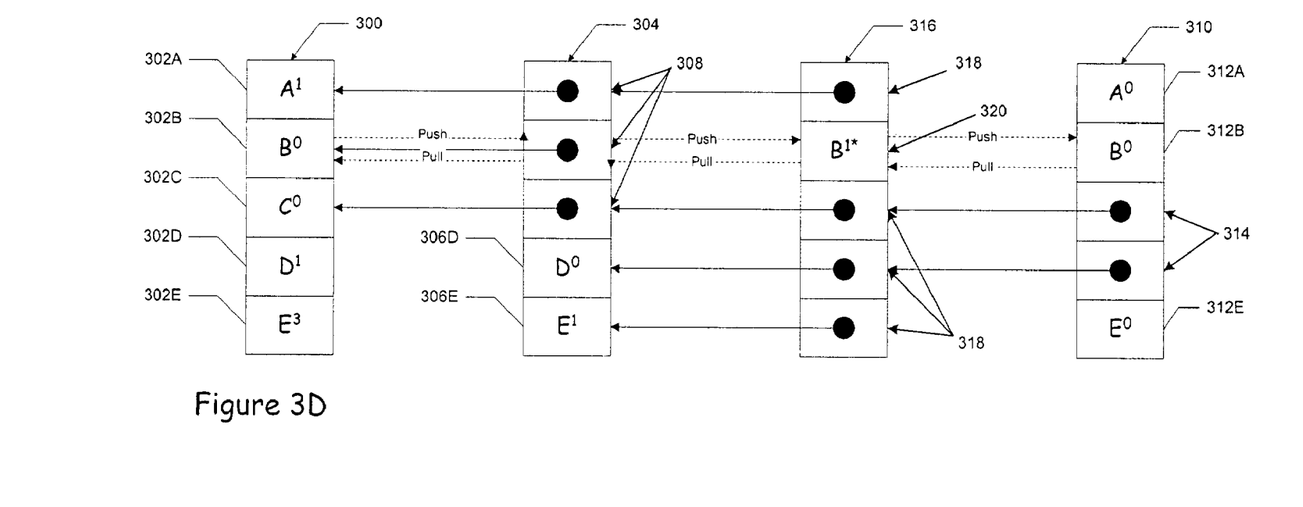

FIGS. 3C and 3D illustrate a storage checkpoint write operation according to a second prior art technique. Using the file system depicted in FIG. 3A and its accompanying description above as a reference, at an alternate second time, $t_1$, represented by FIG. 3C an additional storage checkpoint 316 is generated based on, and includes a plurality of references 318 to, storage checkpoint 304. At a time $t_2$, represented by FIG. 3D, a write of $B^{1*}$ is performed to storage checkpoint 316, rather than to storage checkpoint 304 as described with respect to FIG. 3B. While the alternative prior art technique illustrated in FIGS. 3C and 3D preserves the point-in-time image of the primary file set at the time storage checkpoint 304 was created, unlike the technique described with respect to FIGS. 3A and 3B, it nevertheless suffers from all of that technique's other described drawbacks.

SUMMARY OF THE INVENTION

Disclosed is a method and system of providing a write-accessible storage checkpoint. Embodiments of the present invention allow a write operation to be performed on a target storage checkpoint of said storage checkpoint chain while the storage checkpoint chain's capability to re-create a set of data as the set of data existed at any of a plurality of points in time is preserved.

According to one embodiment, a first writable storage checkpoint is associated with a first storage checkpoint of a storage checkpoint chain where the storage checkpoint chain is independent of the first writable storage checkpoint and a write operation is then performed utilizing the first writable storage checkpoint.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings in which.

The use of the same reference symbols in different drawings indicates similar or identical items.

DETAILED DESCRIPTION

Although the present invention is described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" means that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

According to one embodiment of the present invention, an additional storage checkpoint is associated with each additional storage checkpoint of a storage checkpoint chain which is to be mounted as writable. All write operations to a target storage checkpoint are then performed on an additional associated storage checkpoint(s) and the storage checkpoint chain is modified such that no storage checkpoints "downstream" from a target checkpoint reference the additional associated storage checkpoint. In the described embodiment, a chain of storage checkpoints exists, $C_n, \ldots, C_1, C_0$, such that $C_0$ is the oldest storage checkpoint and $C_n$ the newest in the chain, followed by a primary file set, $C_{n+1}$. In the described embodiment, an arbitrary storage checkpoint $C_k$, $0 \leq k \leq n$, is mounted as a writable storage checkpoint.

When the storage checkpoint is initially mounted as writable, a "child" or "branch" storage checkpoint, $C_{k'}$ is created which is associated with, and rooted at, the storage checkpoint $C_k$. According to one embodiment, $C_{k'}$ includes only references or "overlay extents" to the storage checkpoint $C_k$. No "downstream" storage checkpoint $C_j$, where j<k, depends on the storage checkpoint $C_{k'}$ because $C_{k'}$ does not occur in the path to the primary file set which serves as the root node of the storage checkpoint "tree". A write may be performed on the writable storage checkpoint by first reading in data (if any) for blocks or extents that are going to be partially modified and then writing back the updates or changes to the storage checkpoint $C_{k'}$.

Advantages of the described embodiment include that storage checkpoints of a storage checkpoint chain may be modified while preserving the consistency of the chain as one or more point-in-time representations of a primary file set, there are no required push and pull operations typically associated with writable storage checkpoints, that deleting the writable storage checkpoint leaves no trace on the file system, that the duplication of data associated with conventional writable storage checkpoints is avoided, and that writes to the storage checkpoint $C_{k'}$ need not be serialized against reads or writes on other storage checkpoints within the file system. Writes to the storage checkpoint $C_{k'}$ need not always be serialized against reads or writes on other storage checkpoints because 1) changes made to the checkpoint $C_{k'}$ are not referenced by any downstream storage checkpoint and 2) changes made upstream of the storage checkpoint $C_k$ will result in the modification of (at most) storage checkpoint $C_k$ and $C_{k'}$ will be insulated against such changes to the extent that block maps on $C_{k'}$ won't change as a result. An additional advantage according to another embodiment of the present invention is that an undo feature may be provided thereby to revert to the state of the storage checkpoint prior to any storage checkpoint updates simply by re-initializing the storage checkpoint $C_{k'}$.

Figure 4:
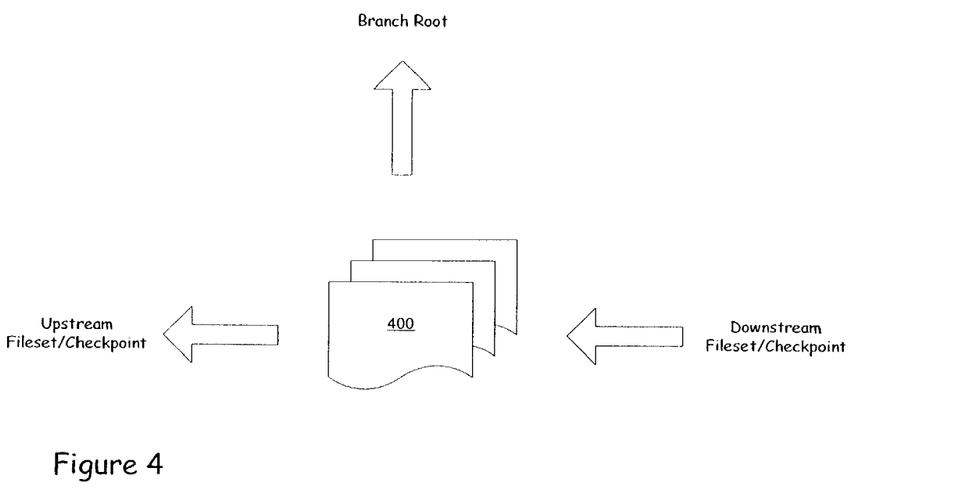
FIG. 4 illustrates a storage checkpoint according to an embodiment of the present invention.

FIG. 4 illustrates a storage checkpoint according to an embodiment of the present invention. The storage checkpoint 400 of the embodiment illustrated by FIG. 4 includes an upstream file set/storage checkpoint reference and a root branch reference and is in turn referenced by a downstream file set/storage checkpoint as shown. In the described embodiments, the terms "upstream" and "downstream" are utilized to describe the relationship of two or more file sets and/or storage checkpoints to one another. More specifically, a "downstream" file set or checkpoint is one which was either created earlier in time or which is a storage checkpoint of a particular file set or storage checkpoint. Similarly, an "upstream" file set or checkpoint is one which was either created later in time or which is the subject or "base" of a particular file set or storage checkpoint. It should be readily appreciated that the terms "upstream" and "downstream" have been arbitrarily selected for illustrative purposes only. The branch root reference is utilized according to one embodiment to provide a writable storage checkpoint. According to one embodiment of the present invention, the upstream file set/checkpoint reference and branch root reference of a primary file set are both equal to null. In another embodiment, no branch root reference exists for any read-only storage checkpoint and no upstream file set/checkpoint reference exists for a writable storage checkpoint.

Figure 5:
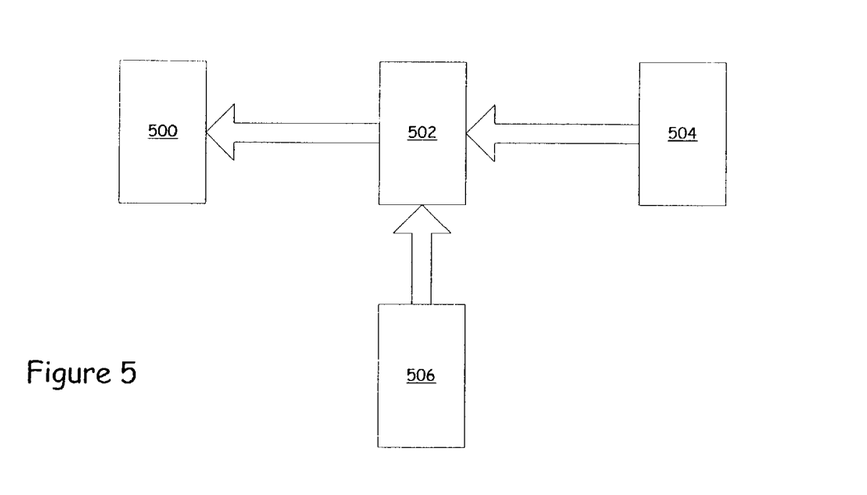
FIG. 5 illustrates a file system including a write accessible storage checkpoint according to an embodiment of the present invention.

FIG. 5 illustrates a file system including a write accessible storage checkpoint according to an embodiment of the present invention. The file system of the illustrated embodiment includes a primary file set 500, a storage checkpoint chain including a first storage checkpoint 502 and a second storage checkpoint 504, and a write accessible storage checkpoint 506 associated with the first storage checkpoint 502 as shown. According to one embodiment, primary file set 500, first storage checkpoint 502, and second storage checkpoint 504 are associated with one another using upstream file set/checkpoint references and write accessible storage checkpoint 506 is associated with first storage checkpoint 502 using a branch root reference. According to one embodiment, of the present invention write accessible storage checkpoint 506 may be mounted utilizing a conventional mount command or technique and data can be subsequently written to write accessible storage checkpoint 506. In yet another embodiment, the described write operation may be "undone" by re-initializing write accessible storage checkpoint 506 to again include only references (e.g., pointers, overlay extents, etc.) corresponding to data blocks of primary file set 500 via storage checkpoint 502.

In the illustrated embodiment, the storage checkpoint chain, including first storage checkpoint 502 and second storage checkpoint 504, is said to be independent of the write accessible storage checkpoint 506 due to the fact that, while write accessible storage checkpoint 506 references one or more storage checkpoints within the storage checkpoint chain, no storage checkpoint within the chain references write accessible storage checkpoint 506. More specifically, according to another embodiment of the present invention, the storage checkpoint chain, including storage checkpoint 502 and storage checkpoint 504, is deemed independent of write accessible storage checkpoint 506 due to the fact that no downstream checkpoint (e.g., storage checkpoint 504) references write accessible storage checkpoint 506.

Figure 6:
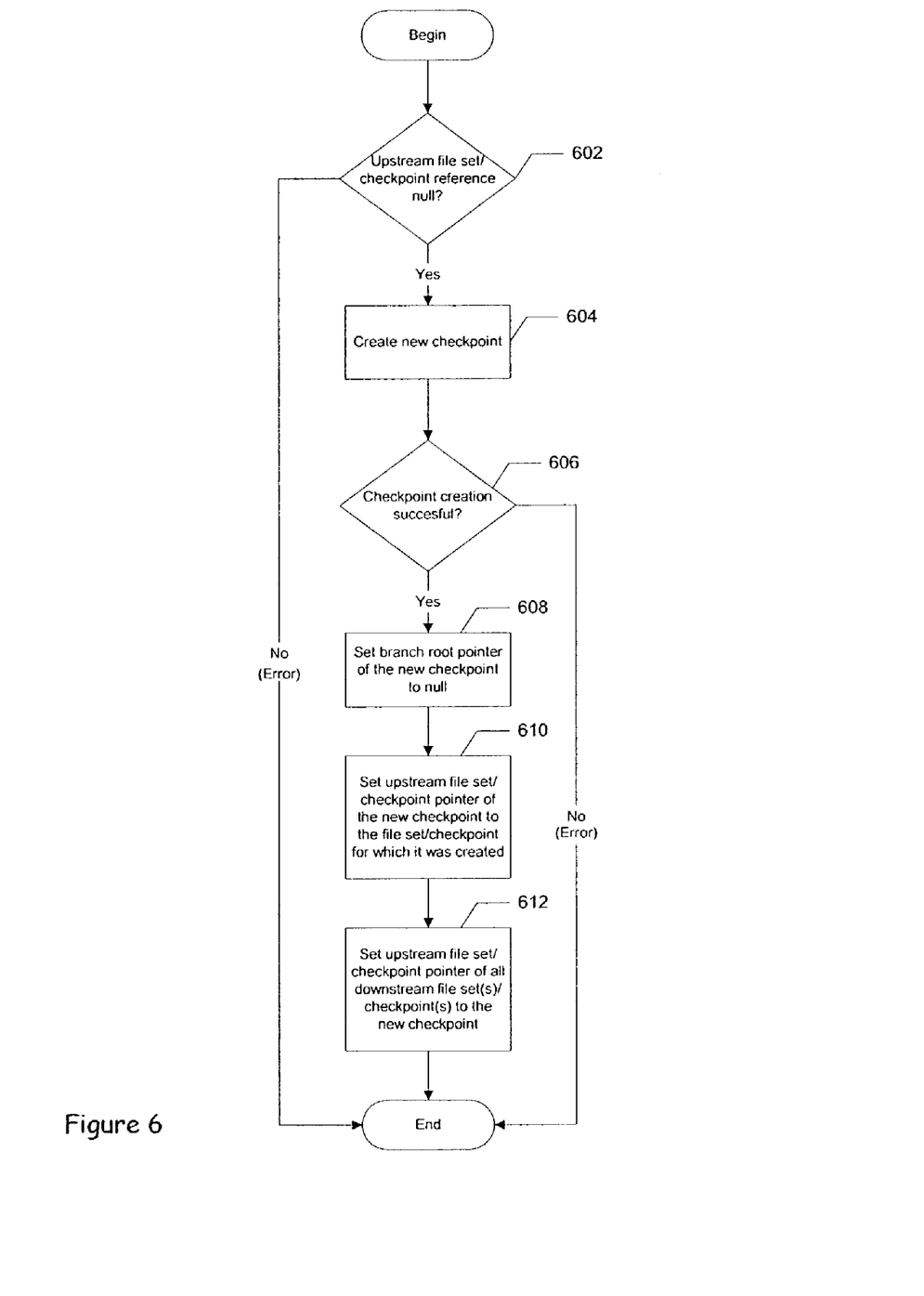
FIG. 6 illustrates a storage checkpoint creation process according to an embodiment of the present invention.

FIG. 6 illustrates a storage checkpoint creation process according to an embodiment of the present invention. In the illustrated process embodiment, a determination is initially made whether the upstream file set/storage checkpoint reference's value of the file set or storage checkpoint for which the new storage checkpoint is to be created is null (process block 602). This determination is made according to the described embodiment to determine whether the storage checkpoint for which the new storage checkpoint is to be created is a read-only storage checkpoint, in which case there is no need to form an additional storage checkpoint. Accordingly, all storage checkpoints are formed in the embodiment depicted in FIG. 6 of either the primary file set (e.g., primary file set 500 of FIG. 5) or of a writable storage checkpoint (e.g., write accessible storage checkpoint 506 of FIG. 5). If the target storage checkpoint's upstream file set/storage checkpoint reference is found to have a non-null value, an error signal is generated. Otherwise, a new storage checkpoint is created (process block 604) as shown.

Once a new storage checkpoint has been generated (process block 604), a determination is then made whether the storage checkpoint creation operation was successful (process block 606). If a failure to create the storage checkpoint is detected (e.g., due to insufficient resources to store the storage checkpoint and its associated data), an error signal is generated. Otherwise, if the storage checkpoint is generated successfully, the branch root pointer of the newly created storage checkpoint is set to null (process block 608), the new checkpoint's upstream file set/storage checkpoint reference is set to the file set/storage checkpoint for which it was created (process block 610), and the upstream file set/storage checkpoint pointer of the immediately downstream, and all branch file set(s) and/or storage checkpoint(s), are set to the newly created checkpoint (process block 612) to form a storage checkpoint chain.

Figure 7:
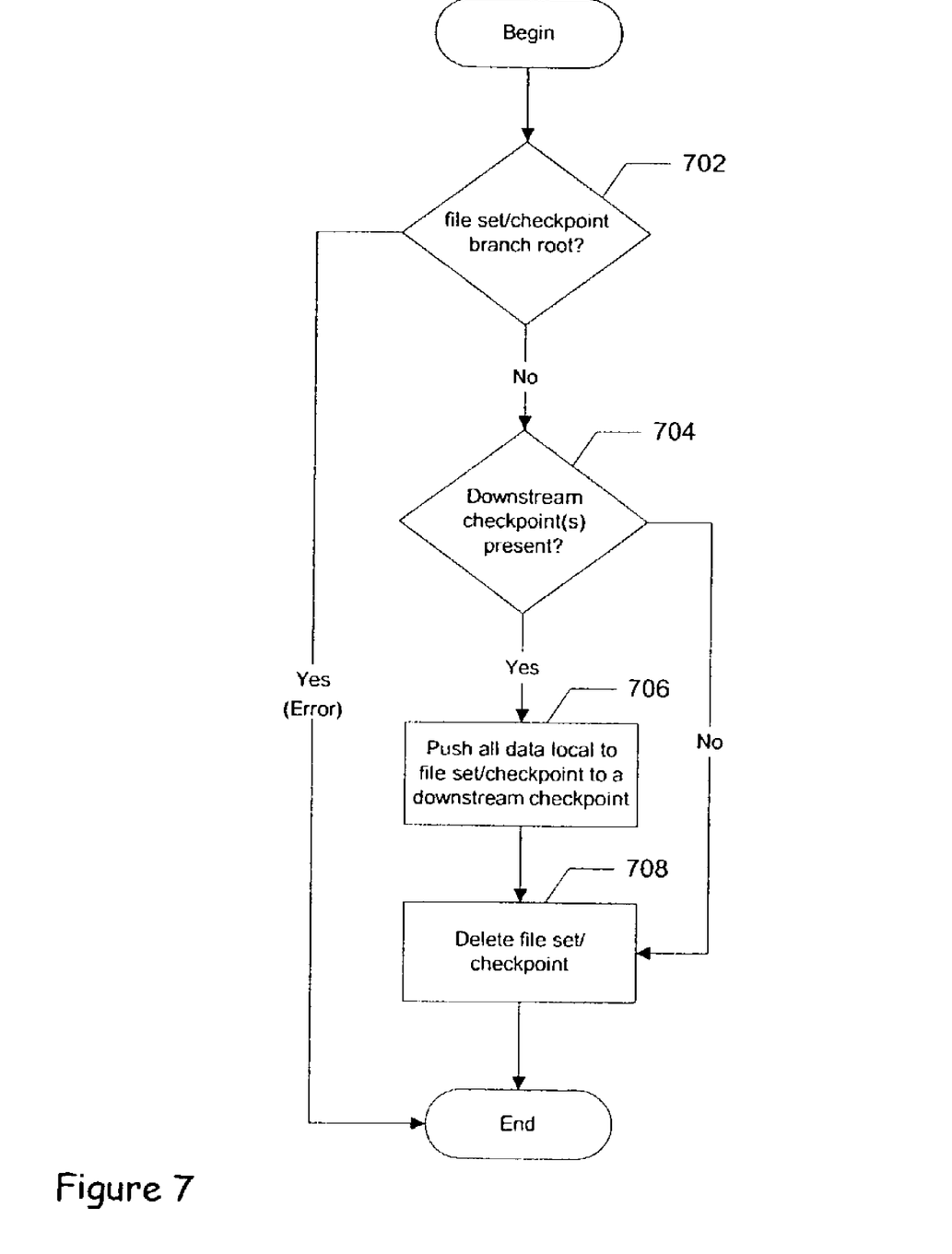
FIG. 7 illustrates a storage checkpoint deletion process according to an embodiment of the present invention.

FIG. 7 illustrates a storage checkpoint deletion process according to an embodiment of the present invention. In the illustrated process embodiment, a determination is initially made whether the file set/storage checkpoint to be deleted is the root of a branch within the tree-structure formed according to embodiments of the present invention described herein (process block 702). Such a determination may be made according to one embodiment by checking the branch root reference of each file set/storage checkpoint within the file system of the storage checkpoint to be deleted to determine whether any such branch root references point to or indicate the storage checkpoint in question. This determination is made to prevent the removal or deletion of a storage file set or storage checkpoint for which writable children exist. If the file set/storage checkpoint to be deleted is determined to be the root of a branch, an error signal is generated. Otherwise, a subsequent similar determination is made to determine whether any downstream storage checkpoint exists within the file system which references the storage checkpoint to be deleted (process block 704). If no such storage checkpoint can be identified, the file set/storage checkpoint to be deleted is the final element in a chain and may simply be deleted (process block 708). If downstream storage checkpoints are located however, a write or "push" of all data local to the file set/storage checkpoint to be deleted must be performed to a downstream storage checkpoint (e.g., the storage checkpoint immediately downstream from the file set/storage checkpoint to be deleted in the chain) (process block 706). Once this push operation, if required, has been performed, the file set/storage checkpoint may be deleted (process block 708) as shown.

Figure 8:
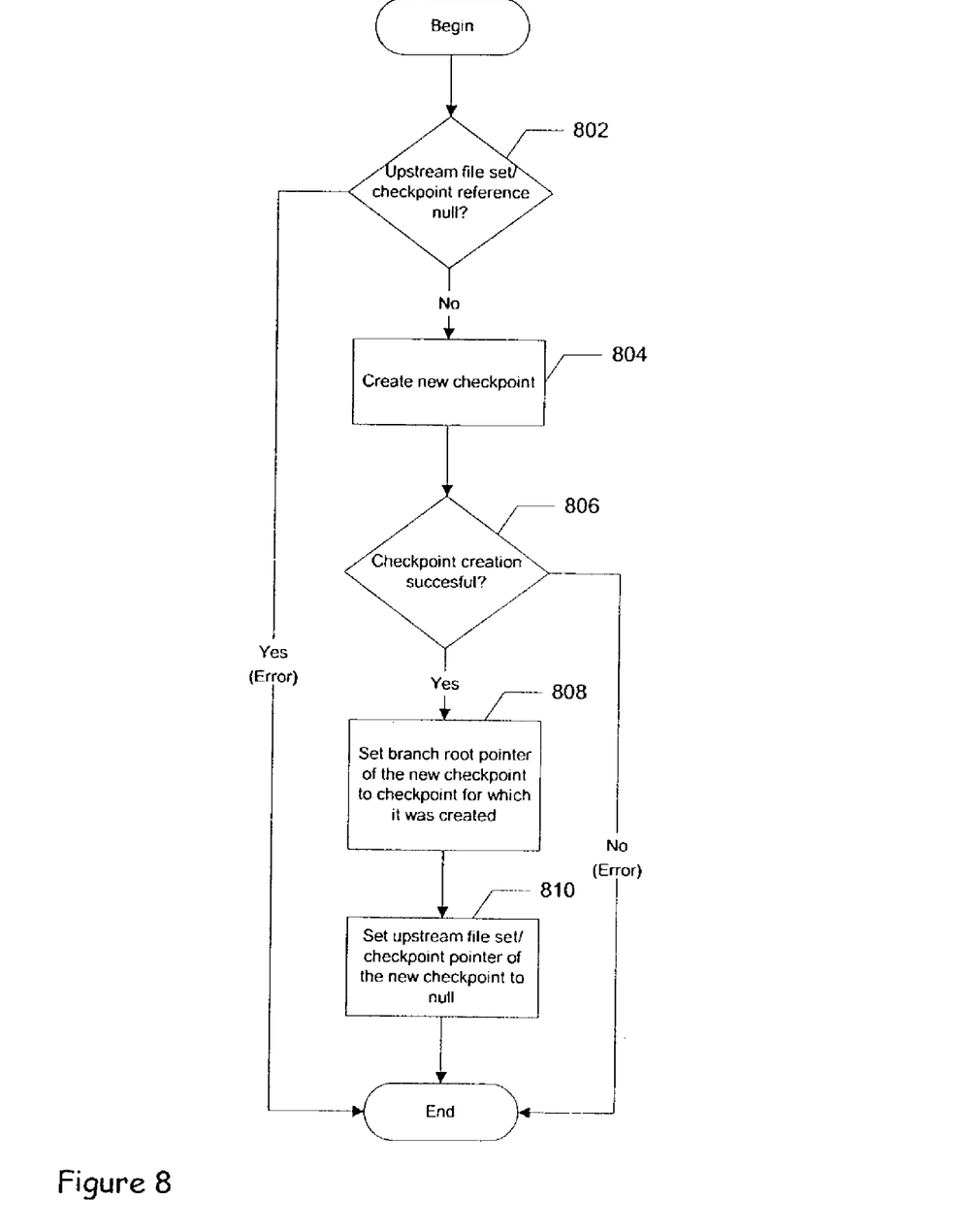
FIG. 8 illustrates a storage checkpoint branch operation according to an embodiment of the present invention.

FIG. 8 illustrates a storage checkpoint branch operation according to an embodiment of the present invention. In the described embodiment, file set(s) and/or storage checkpoints to which branches may be added are limited to read-only storage file set(s)/storage checkpoint(s). Consequently, a determination is initially made whether the upstream file set/storage checkpoint reference's value of the file set or storage checkpoint for which the new storage checkpoint is to be created and branched from is null (process block 802). If the target storage checkpoint's upstream file set/storage checkpoint reference is found to have a null value, an error signal is generated. Otherwise, a new storage checkpoint is created (process block 804) as shown.

Once a new storage checkpoint has been generated (process block 804), a determination is then made whether the storage checkpoint creation operation was successful (process block 806), as previously described with respect to FIG. 6. If a failure to create the storage checkpoint is detected, an error signal is generated. If the storage checkpoint is generated successfully however, the branch root pointer of the newly created storage checkpoint is set to the file set/storage checkpoint for which the new checkpoint was created (process block 808) and the new checkpoint's upstream file set/storage checkpoint reference is set to null (process block 810) thus forming a branch in the described storage checkpoint tree structure.

Figure 9:
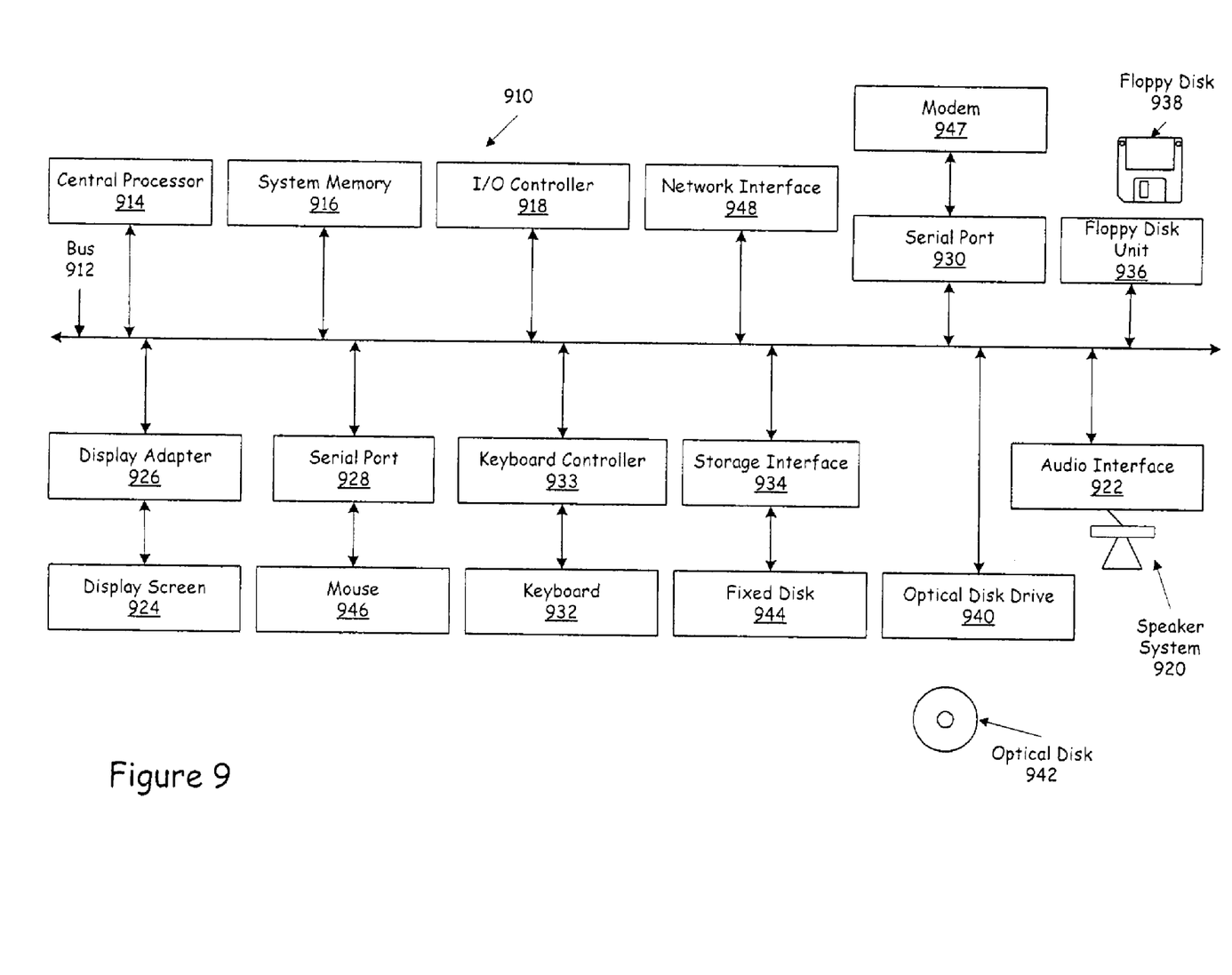
FIG. 9 illustrates a block diagram of a data processing system suitable for implementing embodiments of the present invention.

FIG. 9 illustrates a block diagram of a data processing system suitable for implementing embodiments of the present invention. Computer system 910 includes a bus 912 which interconnects major subsystems of computer system 910 such as a central processor 914, a system memory 916 (typically RAM, but which may also include ROM, flash RAM, or the like), an input/output controller 918, an external audio device such as a speaker system 920 via an audio output interface 922, an external device such as a display screen 924 via display adapter 926, serial ports 928 and 930, a keyboard 932 (interfaced with a keyboard controller 933), a storage interface 934, a floppy disk drive 936 operative to receive a floppy disk 938, and a CD-ROM drive 940 operative to receive a CD-ROM 942. Also included are a mouse 946 (or other point-and-click device, coupled to bus 912 via serial port 928), a modem 947 (coupled to bus 912 via serial port 930) and a network interface 948 (coupled directly to bus 912).

Bus 912 allows data communication between central processor 914 and system memory 916, which may include both read only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., CD-ROM drive 940), floppy disk unit 936 or other storage medium. Additionally, applications may be in the form of electronic signals modulated in accordance with the application and data communication technology when accessed via network modem 947 or interface 948.

Storage interface 934, as with the other storage interfaces of computer system 910, may connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 9 to be present to practice the present invention. The devices and subsystems may be interconnected in different ways from that shown in FIG. 9. The operation of a computer system such as that shown in FIG. 9 is readily known in the art and is not discussed in detail in this application. Code to implement the present invention may be stored in computer-readable storage media such as one or more of system memory 916, fixed disk 944, CD-ROM 942, or floppy disk 938. Additionally, computer system 910 may be any kind of computing device, and so includes personal data assistants (PDAs), network appliance, X-window terminal or other such computing device. The operating system provided on computer system 910 may be MS-DOS®, MS-WINDOWS®, OS/2®, UNIX®, Linux® or other known operating system. Computer system 910 also supports a number of Internet access tools, including, for example, an HTTP-compliant web browser having a JavaScript interpreter, such as Netscape Navigator®, Microsoft Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 910). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional data processing system or computer systems; however, those skilled in the art will appreciate that the present invention is capable of being distributed as a program product in a variety of forms, and that the present invention applies equally regardless of the particular type of signal bearing media used to actually carry out the distribution. Examples of such signal bearing media include recordable media such as floppy disks and CD-ROM, transmission type media such as digital and analog communications links, as well as media storage and distribution systems developed in the future.

The above-discussed embodiments may be implemented using software modules which perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
  associating a first writable storage checkpoint with a first storage checkpoint of a storage checkpoint chain, wherein
    said storage checkpoint chain comprises a plurality of storage checkpoints,
    each storage checkpoint of the plurality of storage checkpoints comprises information to recreate a first set of data at a point-in-time associated with the storage checkpoint,
    a storage checkpoint associated with a first point-in-time is dependent upon a storage checkpoint associated with an immediately subsequent second point-in-time, wherein the second point-in-time is later in time than the first point-in-time, and
    each storage checkpoint of the plurality of storage checkpoints is independent of said first writable storage checkpoint; and
  performing a write operation utilizing said first writable storage checkpoint.

2. The method of claim 1, wherein
said storage checkpoint chain comprises a second storage checkpoint, and
said second storage checkpoint directly references said first storage checkpoint.

3. The method of claim 2, wherein
said second storage checkpoint does not reference said first writable storage checkpoint.

4. The method of claim 1, wherein said associating comprises:
  establishing a storage checkpoint tree data structure comprising a primary file set, said storage checkpoint chain, and said first writable storage checkpoint.

5. The method of claim 1, further comprising:
mounting said first writable storage checkpoint; and
in response to said mounting, performing said performing said write operation.

6. The method of claim 1, further comprising:
performing a read operation utilizing said first writable storage checkpoint.

7. The method of claim 1, further comprising:
re-initializing said first writable storage checkpoint; and
performing a read operation utilizing said re-initialized first writable storage checkpoint.

8. The method of claim 1, further comprising:
associating a second writable storage checkpoint with said first storage checkpoint, wherein,
  said storage checkpoint chain is independent of said second writable storage checkpoint, and
  performing a write operation utilizing said second writable storage checkpoint.

9. The method of claim 1, wherein
said first writable storage checkpoint is associated with an extent,
said extent comprises data, and
said performing said write operation comprises
  determining that said extent is to be partially modified,
  performing a read operation of said data from said extent, in response to said determining, and
  performing said write operation to said first writable storage checkpoint in response to said determining and said performing said read operation.

10. A method comprising:
maintaining a storage checkpoint chain comprising one or more storage checkpoints, wherein
  each storage checkpoint is associated with a first set of data,
  each storage checkpoint is generated at an associated point-in-time,
  a storage checkpoint associated with a first point-in-time is dependent upon a storage checkpoint associated with an immediately subsequent second point-in-time, wherein the second point-in-time is later in time than the first point-in-time, and
  each storage checkpoint provides a capability to re-create the first set of data as said first set of data existed at the associated point in time;
performing a write operation on a selected storage checkpoint of said one or more storage checkpoints while preserving said capability to re-create said first set of data as said first set of data existed at the point-in-time associated with the selected storage checkpoint.

11. The method of claim 10, wherein said performing said write operation comprises:
performing a write operation on a writable storage checkpoint associated with said selected storage checkpoint, wherein,
  each of the one or more storage checkpoints is independent of said writable storage checkpoint.

12. A machine-readable medium having a plurality of instructions executable by a machine embodied therein, wherein said plurality of instructions, when executed, cause said machine to perform a method comprising:
  associating a first writable storage checkpoint with a first storage checkpoint of a storage checkpoint chain, wherein
    said storage checkpoint chain comprises a plurality of storage checkpoints,
    each storage checkpoint of the plurality of storage checkpoints comprises information to recreate a first set of data at a point-in-time associated with the storage checkpoint,
    a storage checkpoint associated with a first point-in-time is dependent upon a storage checkpoint associated with an immediately subsequent second point-in-time, wherein the second point-in-time is later in time than the first point-in-time, and
    each storage checkpoint of the plurality of storage checkpoints is independent of said first writable storage checkpoint, and
  performing a write operation utilizing said first writable storage checkpoint.

13. The machine-readable medium of claim 12, wherein said storage checkpoint chain comprises a second storage checkpoint, and said second storage checkpoint directly references said first storage checkpoint.

14. The machine-readable medium of claim 13, wherein said second storage checkpoint does not reference said first writable storage checkpoint.

15. A system comprising:
storage to store a primary file set, a storage checkpoint chain, and a first writable storage checkpoint, wherein,
  said storage checkpoint chain comprises a plurality of storage checkpoints,
  each storage checkpoint of the plurality of storage checkpoints comprises information to recreate a first set of data at a point-in-time associated with the storage checkpoint,
  a storage checkpoint associated with a first point-in-time is dependent upon a storage checkpoint associated with an immediately subsequent second point-in-time, wherein the second point-in-time is later in time than the first point-in-time, and
  each storage checkpoint of the plurality of storage checkpoints is independent of said first writable storage checkpoint; and
a file system module to associate said first writable storage checkpoint with a first storage checkpoint of said storage checkpoint chain and to perform a write operation utilizing said first writable storage checkpoint.

16. The system of claim 15, wherein:
said storage checkpoint chain comprises a second storage checkpoint, and
said second storage checkpoint directly references said first storage checkpoint.

17. The system of claim 16, wherein:
said second storage checkpoint does not reference said first writable storage checkpoint.

18. A system comprising:
means for associating a first writable storage checkpoint with a first storage checkpoint of a storage checkpoint chain, wherein,
  said storage checkpoint chain comprises a plurality of storage checkpoints,
  each storage checkpoint of the plurality of storage checkpoints comprises information to recreate a first set of data at a point-in-time associated with the storage checkpoint,
  a storage checkpoint associated with a first point-in-time is dependent upon a storage checkpoint associated with an immediately subsequent second point-in-time, wherein the second point-in-time is later in time than the first point-in-time, and
  each storage checkpoint of the plurality of storage checkpoints is independent of said first writable storage checkpoint, and
means for performing a write operation utilizing said first writable storage checkpoint.

19. The system of claim 18, wherein:
said storage checkpoint chain comprises a second storage checkpoint, and
said second storage checkpoint directly references said first storage checkpoint.

20. The system of claim 19, wherein:
said second storage checkpoint does not reference said first writable storage checkpoint.

* * * * *